United States Patent [19]

Foidl

[11] Patent Number: 4,588,535

[45] Date of Patent: May 13, 1986

[54] INSTALLATION FOR THE TREATMENT OF COMBUSTION GASES

[76] Inventor: Leonhard Foidl, Hochfügener Strasse 258, A-6263 Fügen, Austria

[21] Appl. No.: 686,257

[22] PCT Filed: Mar. 14, 1984

[86] PCT No.: PCT/AT84/00012

§ 371 Date: Nov. 30, 1984

§ 102(e) Date: Nov. 30, 1984

[87] PCT Pub. No.: WO84/03843

PCT Pub. Date: Oct. 11, 1984

[30] Foreign Application Priority Data

Apr. 1, 1983 [AT] Austria ................ 1167/83

[51] Int. Cl.$^4$ ............................................. B01F 3/04
[52] U.S. Cl. ........................................ 261/22; 55/223; 55/227; 55/256; 261/36 R; 261/72 R; 261/115; 261/119 R; 261/121 R
[58] Field of Search ............... 261/17, 22, 23 R, 115, 261/119 R, 125, 72 R, DIG. 9, 116–118, 36 R, 121 R; 55/255, 241, 256, 227, 223

[56] References Cited

U.S. PATENT DOCUMENTS

| | | | |
|---|---|---|---|
| 1,255,518 | 2/1918 | Ehrhart | 261/115 |
| 3,585,786 | 6/1971 | Hardison | 55/241 X |
| 3,993,448 | 11/1976 | Lowery, Sr. | 55/227 X |
| 4,005,999 | 2/1977 | Carlson | 261/125 X |
| 4,039,307 | 8/1977 | Bondor | 261/17 X |
| 4,312,317 | 1/1982 | Jewett et al. | 261/22 X |

FOREIGN PATENT DOCUMENTS

| | | |
|---|---|---|
| 466194 | 10/1975 | Australia . |
| 285552 | 11/1970 | Austria . |
| 51896 | 5/1890 | Fed. Rep. of Germany . |
| 463679 | 11/1968 | Switzerland . |
| 1024169 | 3/1966 | United Kingdom . |

Primary Examiner—Richard L. Chiesa
Attorney, Agent, or Firm—McGlew and Tuttle

[57] ABSTRACT

For the treatment of combustion gases, particularly for domestic use, the gases are sprinkled or sprayed in parallel current or in counter-current with a washing liquid traversing vertical channels or ducts. At the upper end of each vertical duct there are arranged as sprinkling or spray nozzles a plurality of parallel downwardly directed small tubes pressed against each other. A washing liquid is supplied from a lower collector container or tub by means of a circulation pump up to an upper tank or storage space; with its filling, the liquid level of the lower collector container lowers to a point that the combustion gases from the supply pipe freely enter the first vertical duct and they may be evacuated through the outlet channel or treated gas outlet connected to the last vertical duct. Thereby, the washing liquid which leaves the upper tank through the spray nozzles purifies the gas by removing solid and soluble components while simultaneously cooling the gases. If the circulation pump is disconnected, the liquid level of the lower collector container rises to a point or level where the outlet opening or end of the combustion gases supply pipe is closed.

5 Claims, 2 Drawing Figures

4,588,535

INSTALLATION FOR THE TREATMENT OF COMBUSTION GASES

FIELD AND BACKGROUND OF THE INVENTION

The invention relates to a device for treating combustion gases from combustion units, comprising a vessel, a supply duct for the combustion gases, an exhaust duct for the treated combustion gases, washing liquid provided at two different filling levels in the lower part of the vessel, with the end of the supply duct being dipped into the washing liquid as long as the liquid is at its maximum filling level, and being spaced therefrom if the liquid is at its minimum filling level, and downwardly directed spray nozzles in the upper part of the vessel, with the washing liquid discharged through the nozzles crossing the flow path of the combustion gases.

A device of this kind separating primarily solid particles from smoke may be learned from German Pat. No. 51896, for example. Waste gases, particularly from industrial plants, are directed through or close over the washing liquid, or sprinkled with washing liquid from sprinkling heads, whereby the solid particles are separated from the gaseous ones. Depending on the nature of the liquid, which may be water or an organic solvent, gaseous components of the smoke also may dissolve. The smoke gases flow through the upper part of the vessel without being guided, so that the solvent effect on gaseous components by the washing liquid discharged from the sprinkling heads is not particularly strong. No shutoff mechanism is provided within the device which would prevent the smoke gases from passing therethrough.

To separate solid particles from a gas stream, it is further known, from Austrian Pat. No. 285552, to direct the gas stream through a cylindrical tube through which the discharge duct extends coaxially. The annular space thus formed accommodates downwardly directed spray nozzles which are skirted by the gases flowing downwardly and an annular venturi nozzle is provided below the spray nozzles, effecting the separation of the solid matter. Here again, no flow lock is provided within the device.

Finally, Swiss Pat. No. 463679 discloses a flue gas washing plant comprising a vessel with a washing liquid, where the flow gases escape from a supply tube having its outlet end below the water surface, and are taken by suction through the washing unit by means of an exhauster mounted in the outlet duct. The passage of the flue gases is interrupted by switching off the exhauster.

SUMMARY OF THE INVENTION

The invention is directed to a further development of a device of the above mentioned kind, permitting the improvement of the separation from the combustion gases of gaseous components which are soluble in the washing liquid, and also providing a simple passage lock within the device.

In accordance with the invention, this is obtained by providing in the middle part of the vessel at least one duct, preferably a plurality of ducts extending side by side and communicating with each other through flow passages, with the cross sectional area of the upper end of each of the ducts being completely filled with spray nozzles, and further providing a storage space above the duct or ducts, into which each of the ducts opens and which has a volume corresponding to at least the liquid volume between the two filling levels in the lower part of the vessel, and a connecting line between the lower part of the vessel and the storage space, in which a circulating pump is mounted, with the delivery of the circulating pump per unit time being at least equal to the total amount of washing liquid flowing through all the spray nozzles when the storage space is completely filled.

With the device at rest at a standstill of the combustion unit, in which state the washing liquid reaches its maximum filling level in the vessel, the end of the supply duct is dipped into the washing liquid, whereby a passage lock is formed interrupting the continuous draft through the combustion unit, so that the cooling of this unit is substantially slowed down. If now the combustion unit is put in operation, the circulating pump is also switched on, so that washing liquid is pumped from the lower part of the vessel into the storage space above the spray nozzles. Since the washing liquid amount returning through the spray nozzles during the filling of the storage space is smaller than the delivery of the circulating pump, the liquid level in the lower part of the vessel drops, so that the end of the supply tube is cleared and the combustion gases can flow into the device. To assist the draft, an exhauster may be provided in the outlet duct of the device. Now, as soon as the storage space is filled up, the washing liquid is forced through the spray nozzles, by the increased static pressure if the storage space is open, and under the action of the circulating pump if the storage space is closed, and cleans the combustion gases flowing therethrough. Particularly suitable is a spray nozzle arrangement comprising a plurality of small tubes which are placed in parallel adjacent one another and have a length-to-diameter ratio preferably of 5 to 1 to 10 to 1. In contradistinction to conventional spindle heads, this produces a dense, rain-like sprinkling of the combustion gases. By stopping the operation of the combustion unit, the circulating pump and the exhauster, if provided are also switched off. Then, the washing liquid contained in the storage space slowly returns through the nozzles to the lower part of the vessel and the liquid filling level rises again to its maximum at which the lower end of the combustion gas supply tube is dipped into the liquid and the passage of the gases through the device is locked.

A particularly simple construction is obtained if the middle part of the vessel is designed as a box open at its top and bottom sides and mounted on the lower part, and the ducts are formed by partition walls which are staggered in their vertical positions, so that each of the partition walls leaving a free flow passage above dips into the washing liquid even with the liquid at its lowest level. The device thus comprises three simple parts which may be made, for example, of stainless steel sheets and are only fitted to each other in superposition. A plate may be provided in which the spray nozzles are formed and which is placed on the upwardly protruding partition walls and may at the same time form the bottom of a storage space part, or support a storage space part placed thereon.

In another embodiment of the invention, the middle part of the vessel may be assembled of a plurality of individual tubes forming the ducts which are dipped in the lower part into the washing liquid even with the liquid at its lowermost level, and between which lower and upper flow passages are provided, with the upper end of the tubes being inserted into a transverse tube forming the storage space and the spray nozzles being inserted into the connections therebetween. The lower closure of the tubes can thus be obtained in a simple manner. In a preferred embodiment, an entrance part is provided for the combustion gases in association with the first duct, having its lower end at the level of the lower end of, and adjacent to, the supply tube.

The combination of the inventive features results in a plurality of advantageous effects: due to the repeated deflection of the stream of combustion gases which on their way are exposed, alternately in parallel and ccountercurrently, to the washing liquid discharged through the spray nozzles, not only the combustion gases are stripped of solid particles, but also, even if only water is used, gaseous pollutants, especially $SO_2$, are dissolved to a large extent. The basic idea the invention started from is that at least most of those components can be washed out which also dissolve in the open air in rainwater to form the recently particularly feared so-called "acid rain". Further, at standstill of the device, the higher liquid level in the vessel shuts off the passage for the combustion gases in a simple way requiring no valves or the like which may cause a shutdown of the combustion unit until the repair is made. A third important effect is that the washing liquid heated up by the cooling of the combustion gases during the treatment can be dirrected through a heat exchanger, so that the energy removed from the combustion gases can be recovered again to a large extent. Finally, no stacks or chimneys are needed downstream of the device, since the cooled and cleaned combustion gases can be discharged directly into ambience i.e. into the atmosphere.

BRIEF DESCRIPTION OF THE DRAWINGS

In the following, the invention is described in more detail with reference to the figures in the attached drawing, without being restricted thereto.

DETAILED DESCRIPTION OF THE PREFERRED EMBODIMENTS

Figure 1:
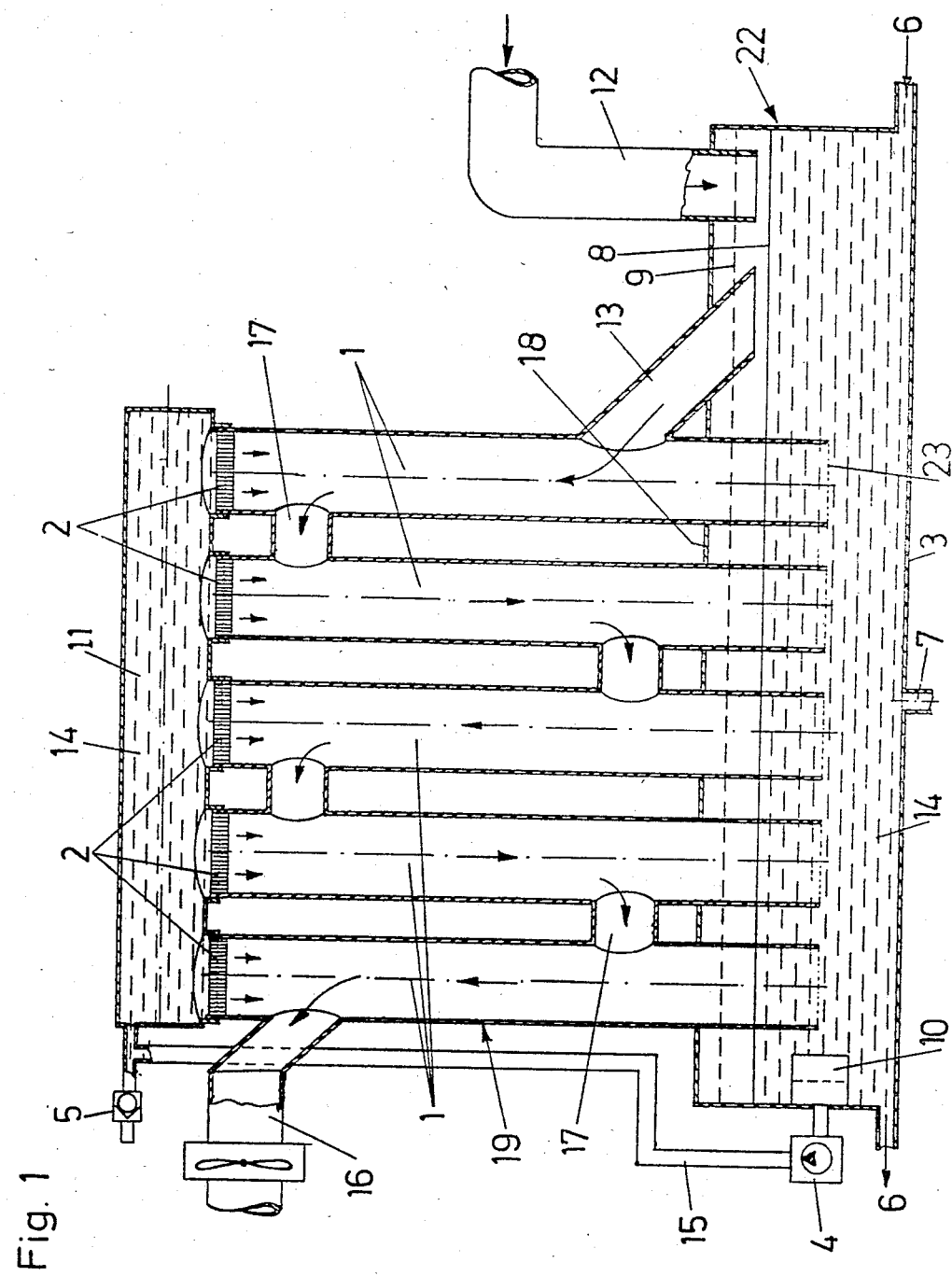
FIGS. 1 and 2 are longitudinal sectional views of two embodiments of the inventive device.

The device comprises a vessel 3 which is formed by a tub-like lower part 22 having a drain connection 7 and a cover 18, as well as a middle part 19 and a row of vertical ducts 1 between which alternately upper and lower flow passages 17 are provided. Ducts 1 which, in this embodiment, are formed by tubes (FIG. 1), extend through cover 18 and are dipped permanently by their lower ends into a washing liquid 14 which is received in bottom part 22 of vessel 3, i.e. they terminate below the minimum liquid filling level indicated at 8. In the upper end portions of ducts 1 spray nozzles 2 are inserted which are formed by a plurality of smaller tubes extending in parallel, and occupying the entire cross-sectional area of the duct. Above spray nozzles 2, a storage space 11 is provided by which the upper ends of all the ducts 1 are connected to each other. From the lower part of vessel 3, a connecting line 15 including a screen, a coarse filter 10, etc. in its end portion protruding into washing liquid 14, leads to storage space 11 and is provided with a circulating pump 4. The branch line at the end adjacent the storage space of connecting line 15 is provided with a check valve 5. Another screen 23 may be provided at the lower end of each of the tubes.

The combustion gases coming from the combustion unit pass through a supply tube 12 into lower part 22 of vesel 3, with the downwardly pointing end of supply tube 12 being spaced apart from the minimal filling level 8 of the liquid by a distance permitting the combustion gases to flow into the device. If, on the contrary, the filling level of the liquid is at its maximum which is indicated by a broken line at 9, the end of supply tube 12 is flooded so that the influx of combustion gases into vessel 3 is shut off. Closely adjacent supply tube 12, an entrance part 13 in the form of the tube length is provided having its lower end at the level of the lower end of supply tube 12, namely between the filling levels 8, 9 of the liquid. With washing liquid 14 at its lowermost filling level, entrance part 13 conducts the combustion gases coming from supply tube 12, into the first of ducts 1 where the gases ascend and are treated countercurrently by the washing liquid 14 which is discharged from spray nozzles 2 of first duct 1 and, for reasons of clarity, indicated only by arrows. The combustion gases then enter through the first, upper flow passage 17 into the next duct 1 where they are conducted downwardly and at the same time treated in parallel by the washing liquid discharged by spray nozzles 2. The combustion gases then flow through the next lower flow passage 17 into the third duct 1 where they ascend again, etc. From the last duct 1, the washed and cooled combustion gases escape through outlet tube 16 where, preferably, an exhauster is mounted to obtain a satisfactory draft action through the device.

With the combustion unit out of operation, circulating pump 4 is also switched off, so that washing liquid 14 rises to its maximum filling level 9 and supply tube 12 becomes flooded. If then the combustion unit starts operating again, circulating pump 4 and the exhauster preferably provided in outlet tube 16 are switched on. Circulating pump 4 then fills storage space 11 while closing check valve 5, since the gravity dependent discharge amount through all the spray nozzles 2 per unit time is smaller than the displacement of the circulating pump. Consequently, the filling level drops to the minimum 8 and supply tube 12 as well as entrance part 13 are clear again. With the storage space 11 filled up, washing liquid 14 is discharged under increased pressure rain-like through spray nozzles 2 into ducts 1 and flows back into the lower part of vessel 3 while washing and cooling the combustion gases. Washing liquid 14 heats up during this process and this heat may be recovered by conducting the liquid through a heat exchanger circuit which is only indicated at 6.

Upon stopping the combustion unit and thus also circulating pump 4 and the exhauster, the washing liquid contained in storage space 11 flows, with check valve 5 opening, through the spray nozzles back into the lower part 22 of vessel 3 where the liquid level rises again and closes supply tube 12. The draft action through the inventive device is thereby interrupted and a rapid cooling down of the combustion unit is checked.

Figure 2:
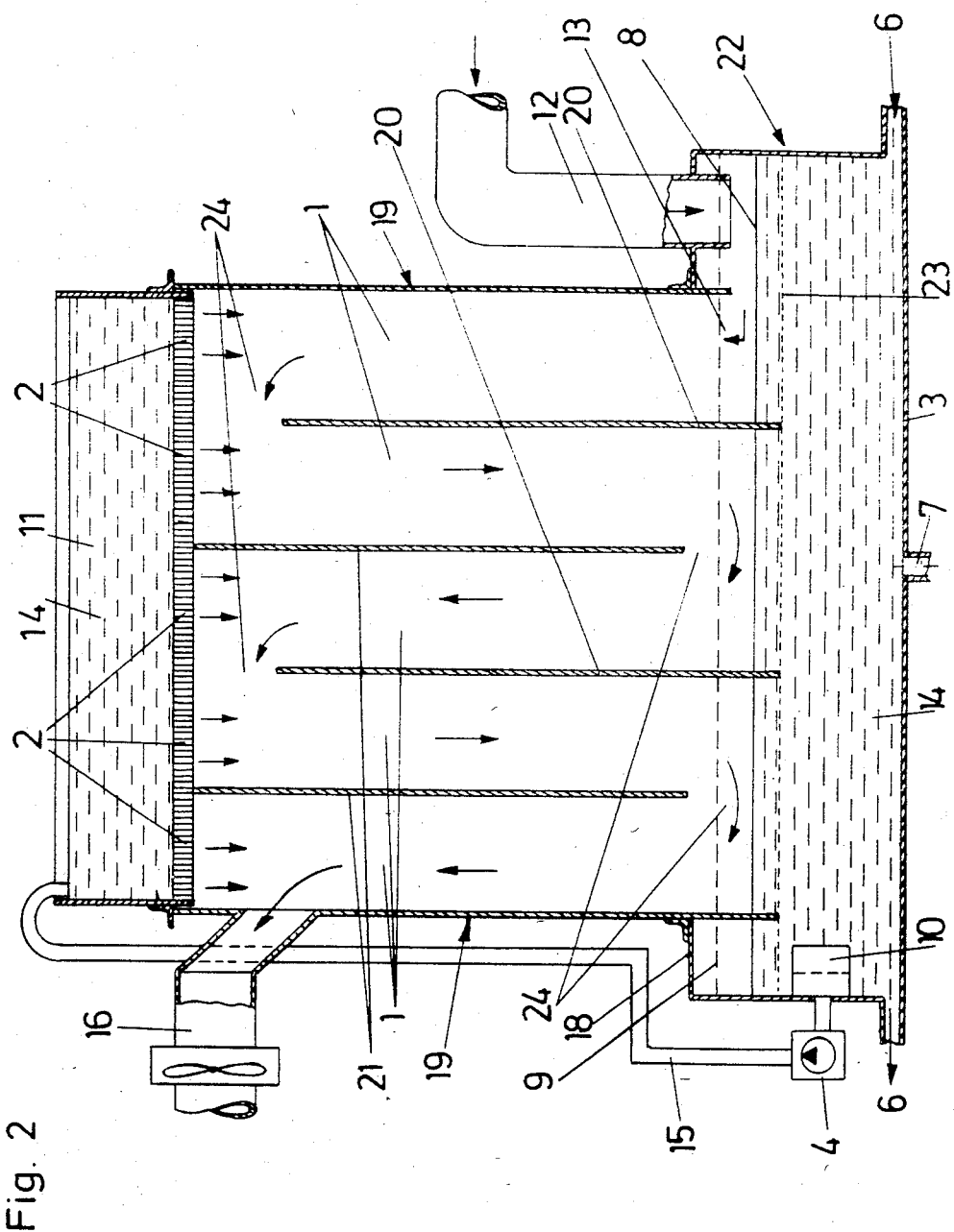

FIG. 2 shows another embodiment in which middle part 19 is formed by a box which is open at the top and bottom and inserted in an aperture of cover 18 of lower part 22 to which it is secured by means of angle brackets or the like. In this embodiment, the ducts in the middle part are formed by partitions 20,21 which are mounted therein in vertically staggered positions. The partitions 20 in lower position protrude downwardly so far that they are dipped into washing liquid 14 even with the liquid at its minimum level 8, while their upper ends remain spaced apart from spray nozzles 2 so that an upper flow passage 24 is formed above each of these partitions 20 between the adjacent ducts 1. In contradistinction thereto, every other partition 21 of equal length but in higher position applies by its upper edge against spray nozzles 2, which in this embodiment, are distributed in a continuous array over the entire bottom area of storage space 11, and has its lower edge spaced from the minimum liquid filing level 8, or even from the maximum liquid filling level 9, whereby the lower flow passages 24 are formed. Entrance part 13 is formed directly by the first vertical duct 1 since the outer wall associated therewith of middle part 19 terminates above minimum filling level 8. In this embodiment, storage space 11 is formed by an open tub, so that no check valve is needed in connecting line 15. The amount of washing liquid passing through spray nozzles 2 is initially smaller, yet with the increasing static pressure of washing liquid 14, it finally attains the delivery of circulating pump 4. This embodiment is particularly simple in construction since substantially only square parts are assembled with each other which, for maintenance of the device, may be disassembled again in the same simple manner. Spray nozzles 2 may be formed, for example, by small tubes, such as hollow-type rivets inserted in a screen plate or produced by deep-drawing of a strip of material.

Another possibility is to subdivide both vessel 3 and storage space 11 into a plurality of compartments having each a connecting line and circulating pump of their own, so that the combustion gases can be treated sequentially with different washing liquids, each serving the purpose of dissolving another gaseous pollutant.

A plant for testing the invention has been set up as follows: A kitchen stove for solid fuel served as the combustion unit and connected thereto was an inventive device with three 1,500 mm long ducts 1 and with spray nozzles formed by an array of small tubes having a length of 20 mm and a diameter of 2 mm. Circulated as washing and cooling liquid wre 40 liters of water. In the kitchen stove, two $dm^3$ of finely cut spruce wood were burned in 20 minutes. The average temperature of the combustion gases at the outlet of the kitchen stove was 400° C., and at the inlet of entrance part 13 such temperature was 360° C. The temperature at the exhaust tube 16 of the device was 35° C.

The circulated 40 liters of water were heated up during this time (of 20 minutes) from 10° C. to 38° C. As compared thereto, during the same period of time, 5 liters of water contained in a cooking pot on the kitchen stove were heated up to only 32° C. Solid particles were washed out of the combustion gases without residuals and the water exhibited a clearly acid reaction.

I claim:

1. Device for treating combustion gases from combustion units, comprising a vessel having an upper part, a middle part and a lower part, a supply duct at one side of the vessel for the combustion gases, an exhaust duct at an opposing side to said one side for the treated combustion gases, a flow path for the combustion gases in the middle part of the vessel extending from the supply duct at said one side to the exhaust duct at said opposing side, means providing washing liquid at two different filling levels in the lower part of the vessel, with the end of the supply duct being dipped into the washing liquid if the liquid is at its maximum filling level and being spaced therefrom if the liquid is at its minimum filling level, and downwardly directed spray nozzles in the upper part of the vessel, with the washing liquid discharged through the nozzles crossing the flow path of the combustion gases, characterized in that in the middle part of the vessel, at least one vertical duct is provided in the flow path, with the cross-sectional area at the upper end of said at least one vertical duct being completely filled with spray nozzles, the spray nozzles comprising a plurality of small diameter flow tubes extending in parallel adjacent each other and each having a flow length to diameter ratio of 5:1 to 10:1, that above said at least one vertical duct a storage space is provided into which said at least one vertical duct opens and which has a volume corresponding to at least the liquid volume between the two filling levels in the lower part of the vessel, and that between the lower part of the vessel and the storage space a connecting line is provided including a circulating pump, with the delivery of the pump per unit time being at least equal to the total amount of liquid flowing through all of the spray nozzles when the storage space is completely filled.

2. Device of claim 1, wherein a plurality of vertical ducts is provided extending side-by-side and communicating with each other through flow passages, with the cross-sectional area at the upper end of each vertical duct being completely filled with the spray nozzles comprising the flow tubes.

3. Device of claim 2, wherein the middle part of the vessel is formed as a box which is open at the top and bottom portions thereof and mounted on the lower part of the vessel, with the vertical ducts being formed by partition walls alternately offset in height, of which every such partition wall leaving free an upper flow passage dips into the washing liquid in the lower part of the vessel even with the liquid at its minimum filling level.

4. Device of claim 2, wherein the middle part of the vessel comprises a plurality of individual vertical tubular elements which form the vertical ducts and are each dipped into the washing liquid, even with the liquid at its minimum filling level, and between which corresponding alternate upper end lower flow passages are provided, with the upper ends of the tubular elements being inserted into a transverse tubular element forming the storage space and defining inlet connections thereat, and with the spray nozzles comprising the flow tubes being inserted as individual tubes in the inlet connections.

5. Device of claim 2, wherein the supply duct comprises a supply tube, and the first vertical duct adjacent the one side of the vessel at which the supply duct is located comprises an entrance port for the combustion gases, having its end at the level of the end of the supply tube and being adjacent thereto.

* * * * *